(12) United States Patent
Pinto

(10) Patent No.: US 8,299,761 B2
(45) Date of Patent: Oct. 30, 2012

(54) DENSE ENERGY STORAGE VIA INTERACTING NANOSTRUCTURES

(75) Inventor: Fabrizio Pinto, Monrovia, CA (US)

(73) Assignee: InterStellar Technologies Corporation, Monrovia, CA (US)

( * ) Notice: Subject to any disclaimer, the term of this patent is extended or adjusted under 35 U.S.C. 154(b) by 506 days.

(21) Appl. No.: 12/649,270

(22) Filed: Dec. 29, 2009

(65) Prior Publication Data
US 2010/0164441 A1    Jul. 1, 2010

Related U.S. Application Data

(60) Provisional application No. 61/141,169, filed on Dec. 29, 2008.

(51) Int. Cl.
*H02J 7/00* (2006.01)
(52) U.S. Cl. ........................................................ 320/167
(58) Field of Classification Search ................. 320/166, 320/167
See application file for complete search history.

(56) References Cited

U.S. PATENT DOCUMENTS

| 6,874,668 | B2 | 4/2005 | Cumings et al. | |
| 7,794,840 | B2 * | 9/2010 | Grigorian et al. | 428/408 |
| 2010/0304256 | A1 * | 12/2010 | Chan et al. | 429/433 |

* cited by examiner

*Primary Examiner* — Ramy Ramadan
(74) *Attorney, Agent, or Firm* — Kaplan Breyer Schwarz & Ottesen, LLP

(57) ABSTRACT

Apparatus and method for dense energy storage is disclosed. The inner tube of a multi-wall nanotube is reversibly withdrawn from the outer tube thereof via a facing electrode that is biased with respect to the nanotube by an external voltage source. As the inner tube is withdrawn, the potential energy of the van der Waals field between the inner tube and the outer tube increases, which manifests as a force that is directed opposite to the electrostatic force of attraction between the electrode and the inner tube. The storage apparatus is discharged by decreasing the applied voltage, which enables the van der Waals force to overcome the electrostatic force. As a consequence, the inner tube is drawn back into the outer tube. The electrode and nanotube define a variable capacitor and, as such, the change in capacitance based on movement of the inner tube results in a flow of charge to a load.

12 Claims, 6 Drawing Sheets

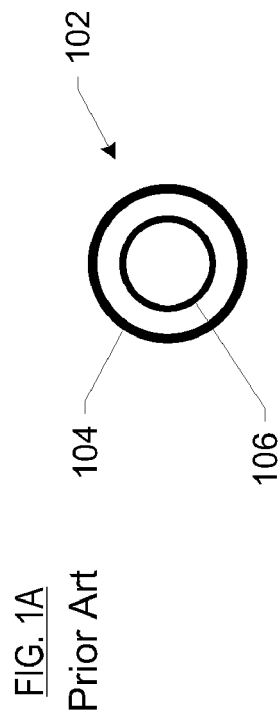
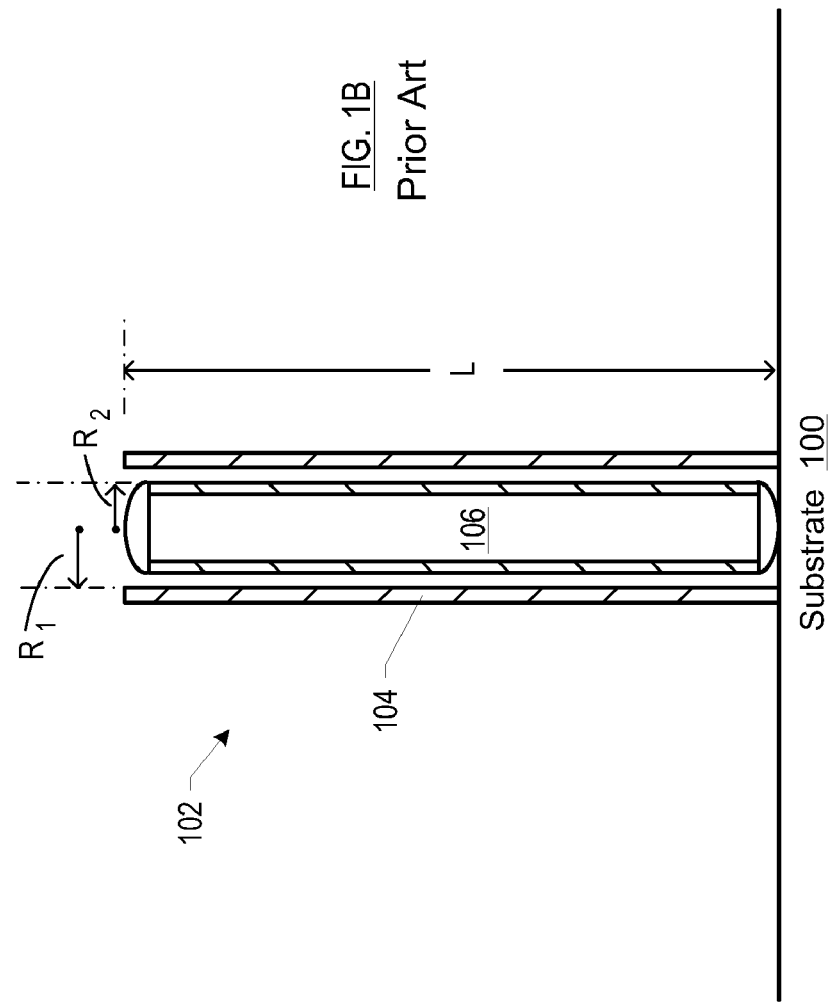

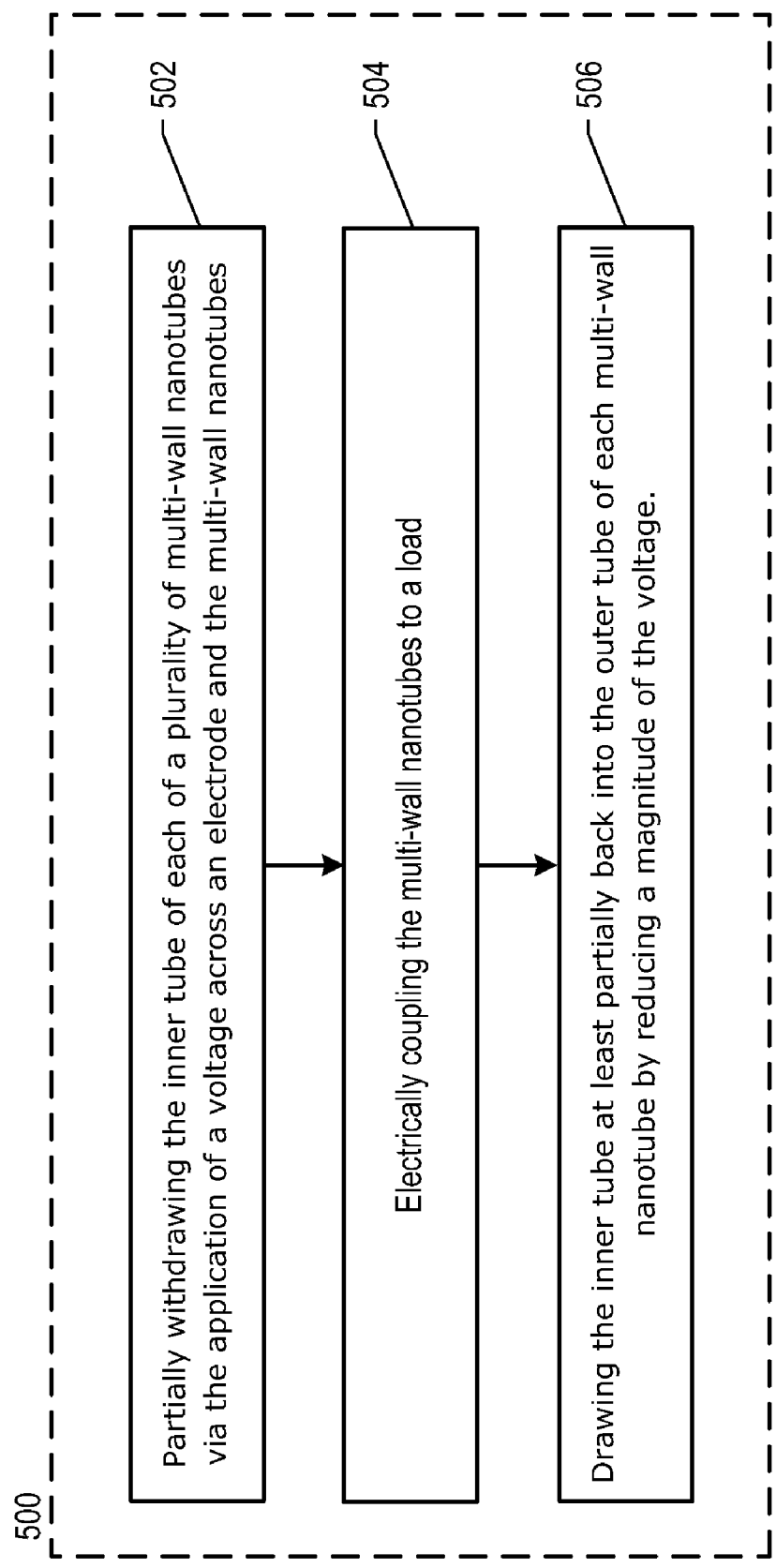

DENSE ENERGY STORAGE VIA INTERACTING NANOSTRUCTURES

CROSS REFERENCE TO RELATED APPLICATIONS

This case claims priority of U.S. Provisional Patent Application 61/141,169, which was filed on Dec. 29, 2008 and which is incorporated herein by reference.

FIELD OF THE INVENTION

The present invention relates to methods and apparatus for energy storage.

BACKGROUND OF THE INVENTION

The energy density of a storage device refers to the amount of energy that can be stored in a given volume or weight of the device. The power density refers to the manner in which energy can be stored in the device. The greater the power density, the faster the storage device can be charged and discharged. In the field of energy storage, the energy density and power density are both of critical importance.

An ideal storage device will possess both a high energy density and a high power density. Unfortunately, most storage devices achieve only one of these characteristics. In particular, with respect to batteries, the energy density is high but the power density is characteristically low. The power density of a battery is controlled by the rate at which chemical reactions occur and there is little ability to change that. On the other hand, capacitors have a limited energy density but a high power density.

Much of the research in the field of energy storage has been directed towards developing storage devices that exhibit both high energy and power density. For example, research into conducting polymers for battery applications has lead to improvements in power density for batteries. Developments include a nano-structured high-surface area electrode material composed of cellulose fibers that are individually coated with a very thin layer of polypyrrole.

A nanocomposite of LiFePO4 nanoparticles embedded in a nano-porous carbon matrix as a cathode material reportedly provides improved power density for lithium-ion batteries. Lithium-ion batteries absorb and release energy via the removal and insertion of Li+ ions and electrons. The power density of a lithium battery depends on the rate at which the ions and electrons can move through the electrolyte and electrode structure into the active electrode material. The LiFePO4 nanoparticles embedded in a nano-porous carbon matrix improve power by improving electron transport in the bulk or at the surface of the material, or on reducing the path length over which the electron and the Li+ ion have to move.

Supercapacitors are electrochemical, double-layer capacitors. Supercapacitors include two electrodes, a separator, and an electrolyte. Energy is stored by charge transfer at the boundary between the electrode and electrolyte. The amount of stored energy is a function of the available electrode surface, the size of the ions, and the level of the electrolyte decomposition voltage. Although an electrolyte is present, the principle of operation for supercapacitors is based on electrostatics, not chemical reactions. As a consequence, the power density is higher than batteries. Yet, supercapacitors generally have a lower energy density than batteries.

Notwithstanding these improvements, a need remains for an energy storage device that provides high energy and power density.

SUMMARY OF THE INVENTION

The present invention provides an energy-storage apparatus and methods for energy storage that avoid some of the drawbacks of the prior art. In particular, embodiments of the present invention provide an energy-storage apparatus that achieves high energy density and a high power density.

An energy-storage device in accordance with the illustrative embodiment of the present invention comprises a plurality of multi-wall nanotubes, at least one electrode that faces the "free" ends of the nanotubes, and control electronics. The control electronics place the electrode and nanotubes in selective electrical contact with a controlled voltage source. The tip of the free end of each of the nanotubes is removed, which exposes and provides access to an inner shell or tube within the outer tube of the multi-wall nanotubes.

Applying a voltage across the electrode and nanotubes generates an electrostatic force of attraction therebetween. This electrostatic force is sufficient to withdraw the inner tube of each multi-wall nanotube. From the perspective of electrostatics, the electrode and the nanotube define a capacitor whose capacitance is dependent upon the variable position of the inner tube. From the perspective of thermodynamics, as the inner tube is being extracted, electrical energy is being stored as an increase in potential energy of a van der Waals field of interaction between the inner tube and the outer tube.

During discharge, the voltage across the electrode and multi-wall nanotubes is decreased to the point where the van der Waals force, which manifests as a "restoring force," is able to draw the inner tube back into the outer tube. As a consequence of the change in the gap between the inner tube and the electrode (as the inner tube is drawn back into the outer tube), the capacitance of the nanotube/electrode system changes. As is well-known from electrostatics, this change in capacitance results in a current through a load.

In other words, the energy stored in the dispersion force field (e.g., van der Waals, Casimir) of the inner/outer tube system reappears as electrical energy (along with a heat loss) as expected from the Second Law of thermodynamics. It is important to notice that, unlike traditional electrochemical energy-storage systems, in this case energy is stored in dispersion force fields.

The total energy content of a single multi-wall nanotube, when the inner tube is fully extracted, is extremely small. When, however, the energy-storage apparatus incorporates millions of aligned multi-wall nanotubes in a dense "forest," the result is an energy-storage device whose energy density is on par with traditional energy storage devices. The geometry of nanotubes, with their exceedingly large effective surfaces, plays a key role in achieving useful energy densities.

Additionally, and very importantly, the charge and discharge characteristics of energy-storage devices disclosed herein are entirely controlled by an external voltage source. The release of stored energy and the recharge process are controlled by the application of a voltage whose time profile is user-assigned.

It is possible, therefore, to permit the nanotube inner tubes to collapse back inside the outer walls in "near free-fall" so as to obtain a power burst of stored energy. Alternatively, the stored energy can be released arbitrarily slowly, as needed. The illustrative embodiment therefore achieves not only very high energy densities but also extremely high power densities. That is, the speed of charge and discharge is not limited by electrochemical processes, as in batteries. Rather, the process is almost exclusively "mechanical" and is characterized by the dynamics of the inner tube motion within the outer tube.

Embodiments of the present invention can be readily scaled to a wide variety of different applications and environments. This includes thin films and microscopic batteries for implants and nano-devices in the medical field. Embodiments of the invention can also be integrated within presently existing solar panels so that energy conversion and storage capabilities are available within the same device.

BRIEF DESCRIPTION OF THE DRAWINGS

FIG. 1A depicts a top view of a conventional multi-wall nanotube.

FIG. 1B depicts a section view of the conventional multi-wall nanotube of FIG. 1A.

FIG. 5 depicts a method in accordance with an illustrative embodiment of the present invention.

DETAILED DESCRIPTION

Figure 2:
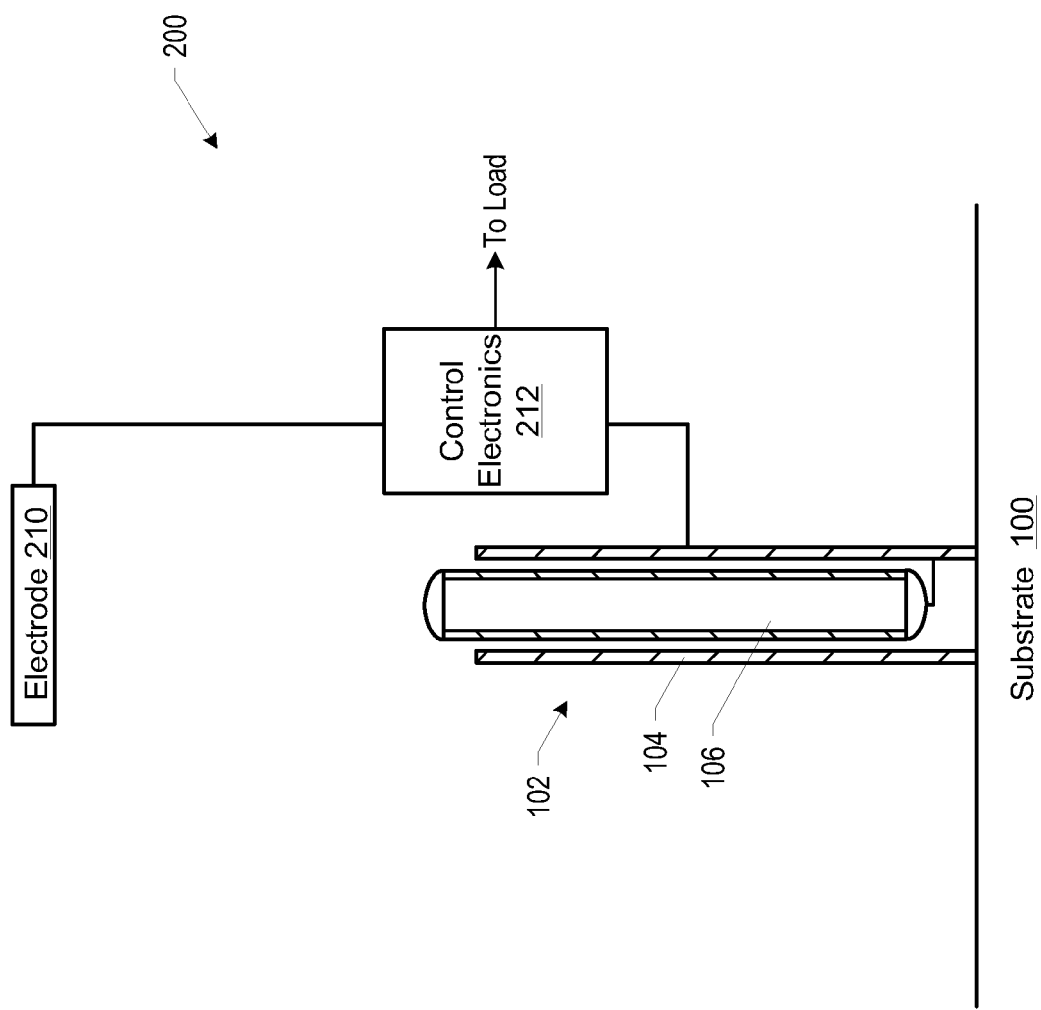
FIG. 2 depicts an energy storage device in accordance with the illustrative embodiment of the present invention.

The following explicit definitions are provided for use in this disclosure and in the appended claims:

The term "nanotube" refers to a cylindrically-shaped and discrete fibril typically characterized by a substantially constant diameter of typically about 1 nm to about 100 nm, preferably about 2 nm to about 50 nm. A nanotube typically exhibits a length greater than about 10 times the diameter, preferably greater than about 100 times the diameter.

The term "multi-wall" as used to describe nanotubes refers to nanotubes having a layered structure, such as a fullerene-like structure, so that the nanotube comprises multiple continuous layers, shells, or tubes of ordered atoms. The layers are disposed substantially concentrically about the cylindrical axis of the fibril. The term "multi-wall nanotubes" is normally used in the art to refer to nanotubes possessing three or more shells; "double-wall nanotubes" is used in the art to refer to nanotubes possessing two shells. For use in this disclosure and the appended claims, the term "multi-wall nanotubes" is to be understood to mean nanotubes possessing two or more shells or tubes.

Structure. The illustrative embodiment of the present invention employs multi-wall nanotubes (hereinafter "MWNTs") as an energy storage device. FIGS. 1A and 1B depict simplified respective top and side-sectional views of conventional MWNT 102.

As depicted in FIGS. 1A and 1B, MWNT 102 comprises outer tube 104 and inner tube 106. The outer tube has radius $R_1$, as measured between the central cylindrical axis of MWNT 102 and the inner surface of outer tube 104. Inner tube 106 has radius $R_2$, as measured between the central cylindrical axis of MWNT 102 and the outer surface of the inner tube. MWNT 102 has a length, L. Outer tube 104 of MWNT 102 has "fixed" end 108 that depends from substrate 100. End 109 of outer tube 104 is "free;" that is, it is not fixed to the substrate or any other layer or structure.

It is to be understood that multi-wall nanotubes can include from as few as two concentric shells or tubes to as many as thousands of such shells. As a function of application specifics, there are a variety of considerations (e.g., purity, geometry, length, fabrication process, etc.) that might dictate the use of nanotubes having a relatively fewer number or a relatively greater number of shells. In the context of the present invention, there is no current preference as to the number of shells or tubes that compose the MWNT. For clarity of illustration and explanation, multi-wall nanotubes are depicted in the appended drawings and described in the disclosure as possessing only two tubes or shells: inner tube 106 and outer tube 104.

Multi-wall nanotubes and methods for their synthesis are well known. Nanotubes made from carbon are the most common and are widely commercially available from suppliers.

The precise composition and method of synthesis of multi-wall nanotubes for use in conjunction with the illustrative embodiment of the present invention are not critical. Suitable multi-wall nanotubes comprise any material as long as the material is electrically conductive and layered in nature. Regarding the latter requirement, suitable multi-wall nanotubes will have a structure in which certain atoms of the structure are held together by strongly directed covalent or ionic bonds in a hexagonal or other array to form layers, while bonds transverse to the layers are formed as a result of weak dispersion forces, such as van der Waals and Casimir.

Examples of materials suitable for forming multi-wall nanotubes include, without limitation, carbon (e.g., graphite), boron nitride, boron carbon nitride and transition metal dichalcogenides. Materials having a crystalline structure selected from the group consisting of GaSe, $NiCl_2$, $TiO_2$, $Sb_2S_3$, $K_4Nb_6O_{17}$, and $PbNb_mS_{(2m+1)}$, where m is an integer from 1 to 10. Also suitable are materials having the crystalline structure $B_xC_yN_z$, where x is about 0 to about 1, y is about 0 to about 3, and z is about 0 to about 4 (see, e.g., U.S. Pat. No. 6,231,980). Multi-wall nanotubes have also been prepared transition metal chalcogenides. Suitable chalcogenides and dichalogenides include, but are not limited to, compounds having the formula $MX_n$ where M is selected from the group consisting of Nb, V, Zr, Hf, Re, Pt, Ta, W, and Mo, X is selected from the group consisting of S, Se, and Te, and n is 2 or 3. Multi-wall nanotubes have the structure $W_aMo_bC_cS_2$, wherein a is about 0 to about 3, b is about 0 to about 3, and c is about 0 to about 4 have additionally been prepared.

FIG. 2 depicts energy-storage apparatus 200 in accordance with the illustrative embodiment of the present invention. Energy-storage apparatus 200 comprises MWNT 102, electrode 210, and control electronics 212, interrelated as shown. Although apparatus 200 can function based the use of a single MWNT 102, the energy storage capacity of such an embodiment will be exceedingly low. As a consequence, embodiments of apparatus 200 of commercial interest will include a plurality of MWNTs. In fact, embodiments of apparatus 200 will typically includes millions of MWNTs.

Processes for fabricating dense "forests" of aligned nanotubes currently exist. In the context of the present invention, it is important to obtain a high proportion of sufficiently regular MWNTs (no kinks) and to achieve a high surface density on a substrate. The general process involves depositing catalyst particles on a substrate by any of various means, such as electrochemical deposition, e-beam lithography, or by evaporation. After the nanotubes are grown at the catalyst sites, they are expected to contain imperfections. In some embodiments, MWNT geometry is improved via high temperature annealing, which causes imperfections to migrate along the tube.

In use, inner tube 106 will slide along the central cylindrical axis of MWNT 102, moving out of outer tube 104 toward electrode 210 and then, as appropriate, back into outer tube 104. Normally, inner tube 106 is inaccessible within outer tube 104. As a consequence, the tip of free end 109 of outer tube 104 is removed. Methods for tip removal of large numbers of MWNTs are known, such as a process that includes planarizing and cutting.

Electrode 210 is spaced apart from the free end of MWNT 102. The fixed gap between the free end of outer tube 104 and electrode 210 is advantageously large enough to ensure that the variable gap between inner tube 106 and the electrode (when tube 106 is fully extended toward electrode 210) is greater than the interwall spacing between outer tube 104 and inner tube 106. In other words, the variable gap>$R_1-R_2$ (see FIG. 1B). If the variable gap is less than the interwall spacing, inner tube 106 is pulled to the electrode, to which it sticks. The interwall spacing is usually 1 nanometer (nm) or less. In practice, that minimum distance is inconsequential as it relates to the fixed gap, which can be about the length of MWNT 102 or, in fact, much larger. The fixed gap will typically be in a range of about 1 micron to 100 microns, and more typically in the range of about 5-10 microns.

Control electronics 212 controls the charging and discharging operations of energy-storage apparatus 200. As discussed in further detail later in this specification, control electronics 212 includes a controlled voltage source for selectively applying a voltage across electrode 210 and MWNT 102, switches for selectively electrically coupling MWNT 102 to the controlled voltage source and a load (e.g., an electrical consumer), and a processor for controlling the operations of the controlled voltage source and the switches.

Thus, control electronics enables a voltage to be applied across electrode 210 and MWNT 102, thereby creating an electrostatic force of attraction therebetween. At sufficient voltage, which is a function of the fixed gap, the conductivity of the MWNT 102, and other parameters, the electrostatic force that is generated is capable of extracting inner tube 106 from outer tube 104.

Figure 3A:
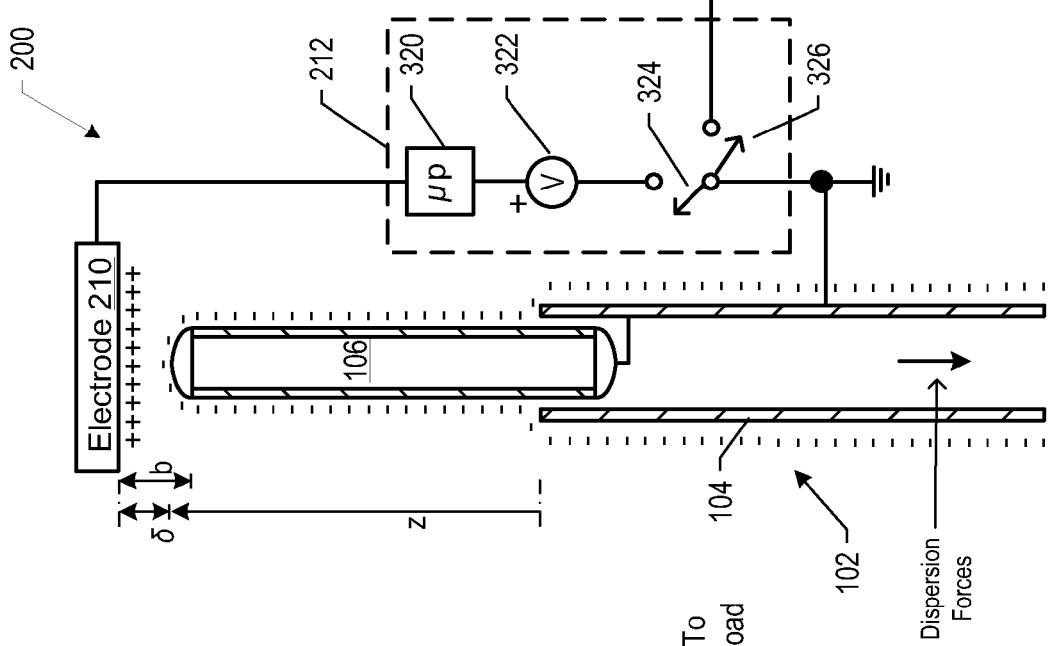
FIG. 3A depicts the energy storage device of FIG. 2 during charging.
Figure 3B:
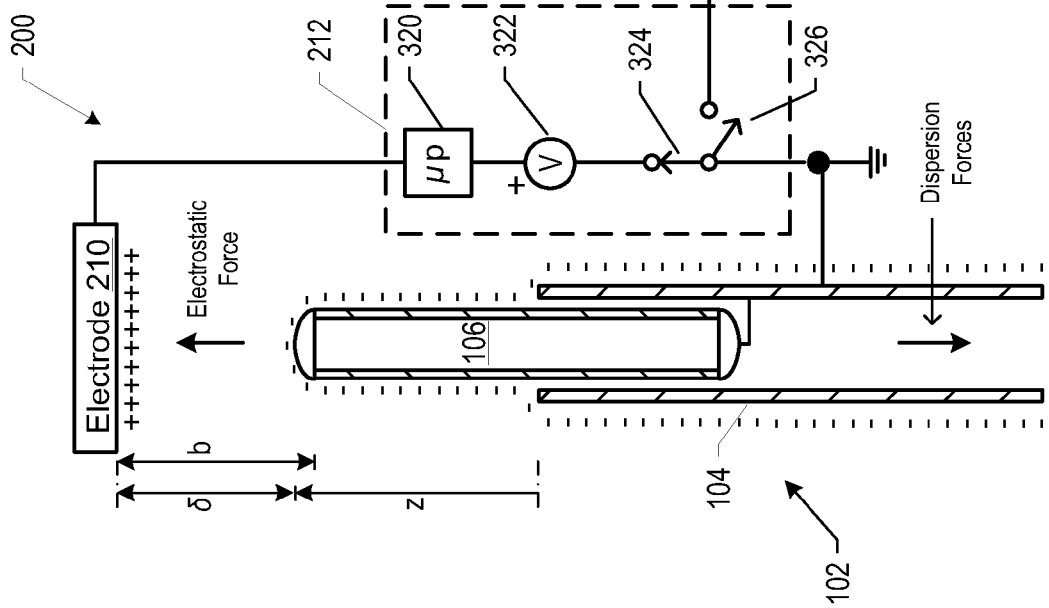
FIG. 3B depicts the energy storage device of FIG. 2 fully charged.
Figure 3C:
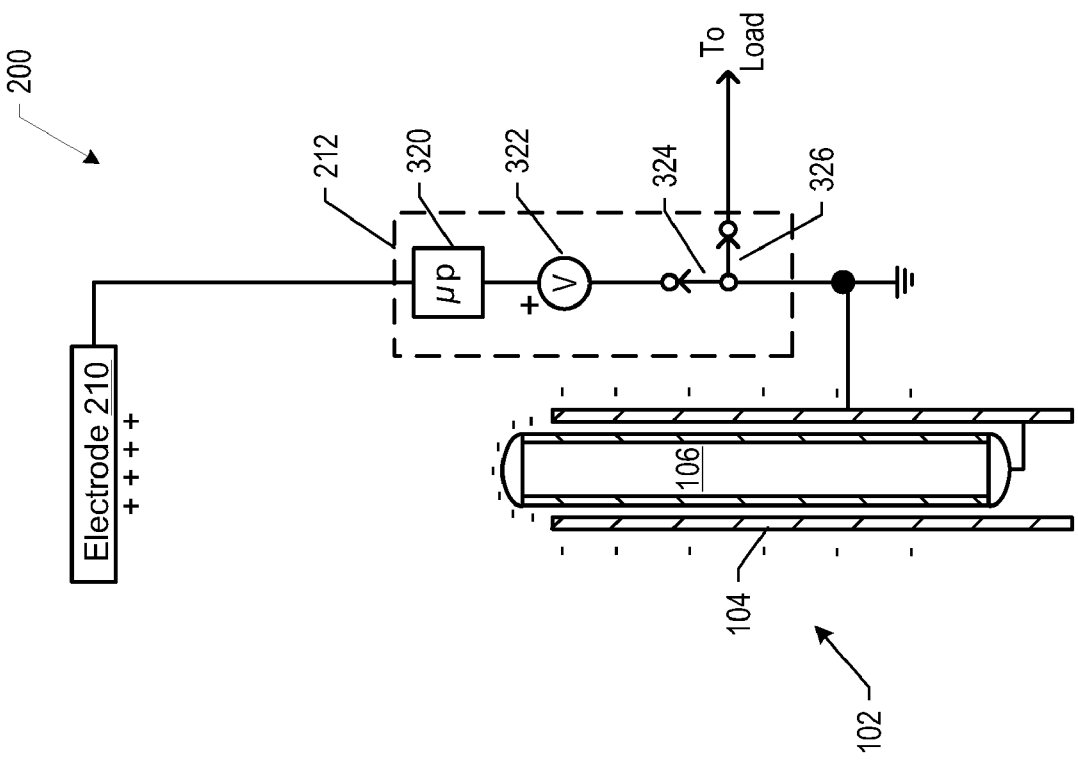
FIG. 3C depicts the energy storage device of FIG. 2 discharged.

Operation. FIGS. 3A through 3C depict the operation of energy-storage apparatus 200. In particular, these Figures depict a cycle whereby apparatus 200 is in the process of being charged (FIG. 3A), is fully charged (FIG. 3B), and is discharged (FIG. 3C).

FIG. 3A depicts energy-storage apparatus 200 during charging. Microprocessor 320 causes switch 324 to close and also causes controlled voltage source 322 to apply a voltage across electrode 210 and MWNT 102. The resulting electrostatic force pulls inner tube 106 out of outer tube 104. As this occurs, a restoring van der Waals force appears, which is capable of pulling inner tube 106 back into outer tube 104.

FIG. 3B depicts energy-storage apparatus 200 fully charged, wherein inner tube 106 has been withdrawn to its maximum extent. Microprocessor 320 causes switch 324 to open. Electrode 210 and inner tube 106 thus collectively function as a variable capacitor, wherein stored energy is a function of the size of the variable gap between the end of the inner tube and electrode.

FIG. 3C depicts energy-storage apparatus 200 after it has fully discharged. To discharge, microprocessor 320 closes switches 324 and 326. Microprocessor 320 causes controlled voltage source 322 to reduce voltage, such that the restoring force (e.g., van der Waals, etc.) now overcomes the electrostatic force. Since the restoring force now dominates, inner tube 106 moves back into outer tube 104. Since the variable gap changes, and apparatus 200 is now coupled to a load, a current flows to the load. The rate at which voltage is reduced controls the rate of discharge; it can be exceedingly quick or very slow.

Figure 4:
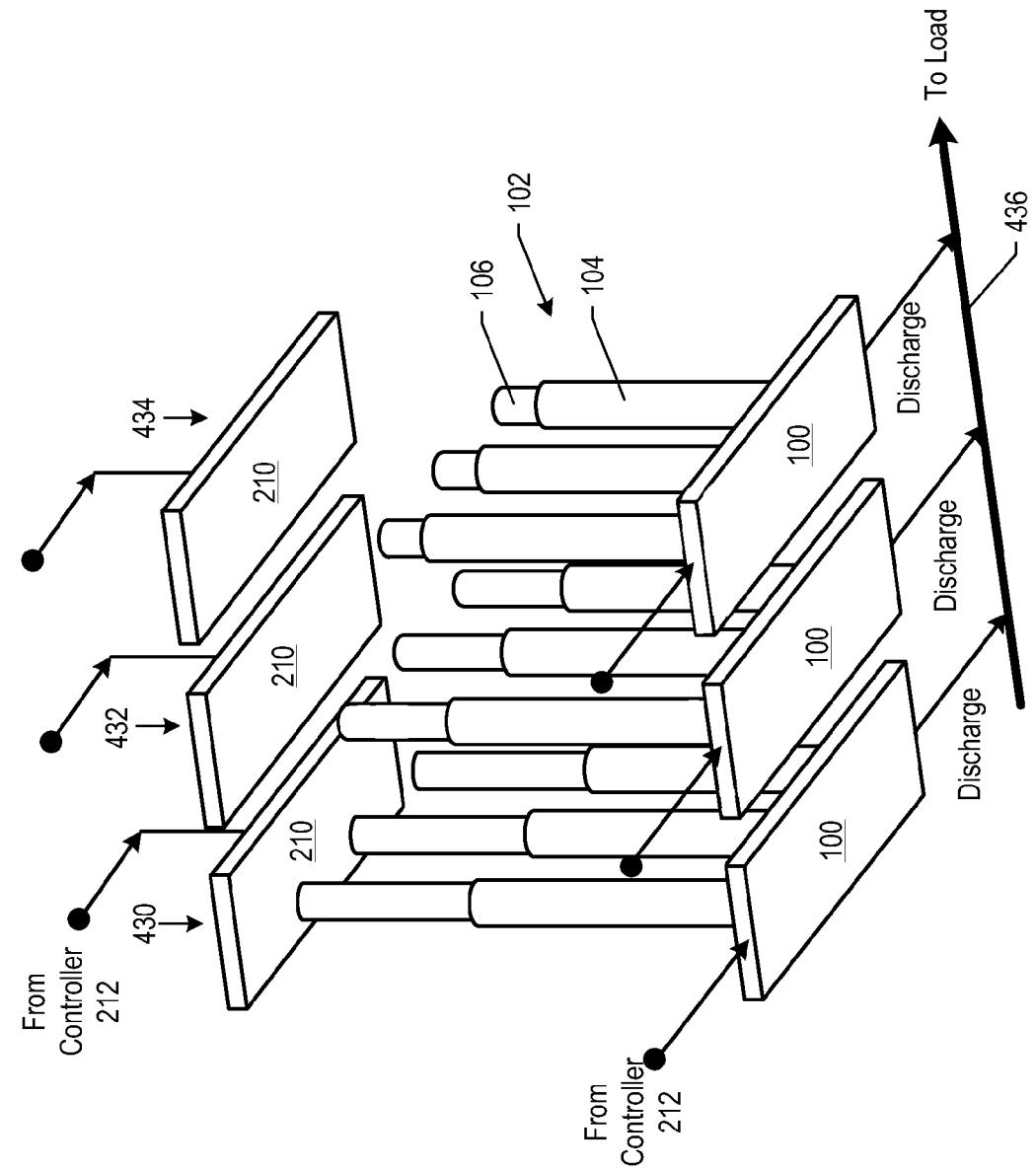
FIG. 4 depicts a perspective view of an energy storage device comprising multiple instances of the device depicted in FIG. 2, and arranged in independently-addressable groups.

FIG. 4 depicts a macro-scale embodiment of energy-storage apparatus 200. Apparatus 200 is structured as a plurality of independently-addressable cells 430, 432, 434. Each cell includes an electrode 210 and a plurality of MWNTs 102, wherein the electrode and MWNTs are selectively electrically coupled to control electronics 212 and selectively electrically coupled to a load through bus 436. All MWNTs 102 in a given cell act in concert, as controlled by control electronics 212. It is to be understood that although the energy storage apparatus depicted in FIG. 4 shows only three cells and three MWNTs per cell, many more cells and many more MWNTs will be present in an actual device. FIG. 4 is simplified for the sake of clarity.

FIG. 4 depicts cell 430 in a fully-charged state, wherein the variable gap between the electrode and the end of the inner tube of each MWNT in the cell is at a minimum size. Cell 432 is depicted in an intermediate state (of charge or discharge), wherein the variable gap is larger than for cell 430. And cell 434 is depicted as being in the initial stage of charging or final stages of discharge, wherein the variable gap is even larger than in cell 432.

Although FIG. 4 depicts the charging/discharging of energy-storage apparatus 200 to be sequenced on a cell-by-cell basis, all cells could be charged or discharged at the same time, as desired.

FIG. 5 depicts method 500 in accordance with the illustrative embodiment of the present invention. In accordance with operation 502, the inner tube of each of a plurality of MWNTs is withdrawn by applying a voltage across an electrode and the MWNTs. As previously discussed, this represents the charging operation.

In operation 504, the MWNTs are electrically coupled to a load. In apparatus 200 previously discussed, this occurs as microprocessor 320 causes switch 326 to close. Operation 506 is the discharging operation, wherein the inner tube of each MWNT is drawn at least partially back into the outer tube thereof. In apparatus 200, this operation is performed by reducing the voltage across the electrode and MWNTs.

Theory. Energy-storage apparatus 200 as disclosed herein is analyzed based on a model of two perfectly conducting, telescoping, concentric cylinders of length L and radii $R_1$ and $R_2$, respectively (see, e.g., FIG. 1B), held at the same electrical potential. The assumption of perfect conductivity provides an upper bound on the performance of the energy-storage apparatus disclosed herein. It is to be understood, however, that dispersion forces (e.g., van der Waals, Casimir) depend drastically on geometry. As a consequence, it is not unlikely that different geometries will exceed even the estimates for the perfect conductors in this illustrative model case. The outer cap of the inner tube is assumed to interact electrostatically with the facing electrode held by an external voltage source at a potential difference V with respect to the two telescoping tubes.

In this configuration, the van der Waals field manifests itself as a restoring force on inner tube 106, which is attracted back within outer tube 104 by a force that is very nearly constant if $R_1,R_2 \ll L$. Since the inner tube interacts capacitively with the fixed electrode, any change in their relative position will result in an electric current if the circuit is closed on a load, as previously discussed.

When inner tube 106 is withdrawn, the van der Waals energy, though negative in sign, is larger (i.e., smaller in absolute value) than when the inner tube is fully retracted; that is, energy is stored in the apparatus. As inner tube 106 is retracted under the action of dispersion forces, which are nearly balanced by the electrostatic interaction between the inner tube and the facing electrode, the van der Waals energy decreases (i.e., its absolute value increases while its sign remains negative). This means that the initial van der Waals energy is converted, in part, into electrical energy that is capable of doing work, the balance being consumed by losses, such as friction of the inner tube as it slides inside the outer tube, Joule heating on the load, and other losses associated with transport processes on the nanoscale.

The notable improvement offered by embodiments of the present invention, even under conservative assumptions, is demonstrated by considering a dense assembly of appropriately prepared MWNTs (e.g., cut, etc.). The specific energy for a macroscopic storage nanotube system with an effective area per unit mass $S_{eff}$ is:

$$U = E \times S_{eff} \quad [1]$$

where: E is the energy of the dispersion field per unit area. The expression for the dispersion field energy of two concentric, perfectly conducting cylinders separated by a gap $s = R_1 - R_2$, where $s \ll R_{1,2}$ is $$E(z) \approx -(L-z)(hc\pi^3/360)R_2/s^3, \quad [2]$$

where: z is the coordinate of the inner tube;
(L−z) is the length of the overlapping region of the two concentric cylinders (z=0 corresponds to a completely retracted inner tube).

Combining and simplifying expressions [1] and [2] provides expression [3] for the specific dispersion force energy of an assembly of concentric, non-extracted cylinders:

$$(S_{eff}/s^3) \approx 1.2 \cdot 10^{-4} (S_{eff}/s_{nm}^3) \quad [3]$$

where: $s_{nm}$ is the interboundary gap between the inner tube and the outer tube in nanometers.

In the case of double-walled carbon nanotubes, values of $S_{eff} \approx 2 \cdot 10^6$ m²/kg are observed, which yields:

$$|U| \approx 240/s_{nm}^3 \text{ Watts} \cdot \text{hr/kg} \quad [4]$$

For s=0.34 nm, the upper limit (in this geometry) is obtained for the specific energy:

$$U \approx 6 \cdot 10^3 \text{ Watts} \cdot \text{hr/kg}. \quad [5]$$

This value exceeds the energy storage of electrochemical batteries by nearly two orders of magnitude. Repeating this calculation in the case of carbon nanotubes by using the interlayer cohesive energy density $\gamma = 0.16$ J/m² yields:

$$U \approx 88 \text{ W} \cdot \text{hr/kg}. \quad [6]$$

This figure is typical of practical batteries and an improvement over supercapacitors.

A dynamical analysis of the electromechanical behavior of the elemental nanotube system provides estimates of the theoretical capacity, power density, and discharge characteristics of energy-storage apparatus 200. This analysis is based on modeling the various forces that act upon the inner tube in conditions of quasi-equilibrium, including:
 (a) the electrostatic interaction between the inner tube and the electrode;
 (b) the electrostatic interaction between the charges distributed on the inner tube and on the outer tube;
 (c) the "sucking" dispersion force between the inner tube and the outer tube; and
 (d) the dispersion force between the inner tube and the electrode.

By requiring the condition of quasi-equilibrium, the following upper value for the charge capacity of an assembly of MWNTs is obtained:

$$Q_{max} \approx 4.61 \cdot 10^{-5} (1/L)(R^2/s^3) S_{eff} \text{ A} \cdot \text{hr/kg} \quad [7]$$

where: all lengths are expressed in nanometers.
For example, choosing s=1.4 nm, $R_2$=5 nm, L=12 nm gives:

$$Q_{max} = 10.4 \text{ A} \cdot \text{hr/kg} \quad [8]$$

This again compares favorably with that of practical batteries (the relevance of the value s=1.4 nm is that it corresponds to an inter-wall distance such that the specific energy predictions from the idealized model and those from the real van der Waals calculations coincide). The voltage required for this charge is about 16.0 volts. In the case of the minimal distance s=0.34 nm:

$$Q_{max} \approx 87 \text{ A} \cdot \text{hr/kg and the voltage required for charge is 106 volts.} \quad [9]$$

An important attribute of the energy storage systems disclosed herein is that the conversion of dispersion force energy to a current is not limited by fundamental electrochemical processes but is, rather, regulated by an external voltage source, V. The ability to directly control the retraction of the inner tube back into the outer nanotube enables a user to impose a desired discharge characteristic by programming a specific voltage time-profile. In this respect, notice that the "free-fall" time typical of the process of retraction of the inner tube in the absence of electrostatic forces is extremely short, $T \sim 10^{-11}$ s. Therefore, large bursts of energy can be obtained by either only partially compensating the dispersion force by means of electrostatic forces or by allowing partial domains of the "forest" of MWNTs to collapse back into their outer walls in nearly-free fall. The upper values on power density is a strong function of the load. Yet, as is clear from the foregoing discussion, the short free fall times indicate that extremely high power densities are possible using the illustrative embodiment of the present invention. In fact, the power density obtainable exceeds that available from either electrochemical batteries or supercapacitors. This result obtains because, in embodiments of the present invention, not only the voltage but also the capacitance changes suddenly as the inner tubes are retracted, yielding extremely high current bursts.

The process of recharge is readily implemented by simply delivering a voltage in excess of the restoring dispersion force so as to re-extract the cores. This process has been demonstrated on an individual nanotube basis to be very effective because of the near-absence of frictional forces between the inner tube and the outer wall.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An energy-storage apparatus comprising:
 a first plurality of multi-wall nanotubes, wherein:
 (i) each multi-wall nanotube includes an inner tube and an outer tube;
 (ii) the outer tube of each multi-wall nanotube has a fixed end that is not free to with respect to a supporting layer and a free end that is free to move with respect to the supporting layer;
 (iii) the inner tube of each multi-wall nanotube is exposed and accessible at the free end of the outer tube; and
 (iv) the inner tube each multi-wall nanotube is movable along a central cylindrical axis thereof and at least a portion of the inner tube is capable of moving beyond the free end of the outer tube;

at least one electrode, wherein the at least one electrode is spaced apart from the free end of the outer tube of the multi-wall nanotubes; and control electronics, wherein the control electronics comprise:
(i) a controllable voltage source for applying a variable voltage across the at least one electrode and the multi-wall nanotubes;
(ii) a first switch for controlling a flow of electrical charge from the voltage source to the multi-wall nanotubes;
(iii) a second switch for controlling a discharge of electrical charge from the multi-wall nanotubes;
(iv) a processor for controlling the operation of the controllable voltage source, the first switch, and the second switch.

2. The energy-storage apparatus of claim 1 wherein the multi-wall nanotubes comprise carbon.

3. The energy-storage apparatus of claim 1 wherein the first plurality of multi-wall nanotubes is segregated into a second plurality of sub-groups, wherein each of the sub-groups contains a portion of the first plurality of multi-wall nanotubes, and further comprising:
a second plurality of electrodes, wherein:
(i) the second plurality of electrodes includes the at least one electrode;
(ii) one electrode from the second plurality thereof is spaced apart from the free end of the outer tube of each multi-wall nanotube in one of the sub-groups, wherein each spaced apart electrode and sub-group defines a cell;
(iii) each cell is independently electrically addressable and electrically isolatable from all other cells.

4. The energy-storage apparatus of claim 3 wherein the control electronics are operable to independently electrically address each cell.

5. The energy-storage apparatus of claim 3 wherein the control electronics are operable to independently vary the magnitude of the voltage across each cell.

6. The energy-storage apparatus of claim 3 wherein the control electronics are operable to independently vary a rate of discharge of electrical charge from each cell.

7. An energy-storage apparatus comprising:
a first plurality of multi-wall nanotubes, wherein each multi-wall nanotube includes an outer tube that, at a first end thereof, is bound to an underlying layer, and further includes a freely-movable inner tube;
at least one electrode, wherein the at least one electrode is spaced apart from a second end of the outer tube of each multi-wall nanotube; and
control electronics for:
(i) applying a variable voltage across the at least one electrode and the multi-wall nanotubes;
(ii) controlling a flow of electrical charge to the multi-wall nanotubes; and
(iii) controlling a discharge of electrical charge from the multi-wall nanotubes.

8. The energy-storage apparatus of claim 7 wherein the first plurality of multi-wall nanotubes is segregated into a second plurality of sub-groups, wherein each of the sub-groups contains a portion of the first plurality of multi-wall nanotubes, and further comprising a second plurality of electrodes, wherein:
(i) the second plurality of electrodes includes the at least one electrode;
(ii) one electrode from the second plurality thereof is spaced apart from the second end of the outer tube of each multi-wall nanotube in one of the sub-groups, wherein each spaced apart electrode and sub-group defines a cell; and
(iii) each cell is independently addressable via the control electronics.

9. A method for storing energy in a plurality of multi-wall nanotubes and releasing the energy, wherein the method comprises:
increasing a potential energy of a van der Waals field existing between an inner tube and an outer tube of each of a plurality of multi-wall nanotubes by partially withdrawing the inner tube of each multi-wall nanotube via the application of a voltage across an electrode and each of the multi-wall nanotubes;
electrically coupling the multi-wall nanotubes to a load; and
discharging electrical energy to the load from each multi-wall nanotube by reducing a magnitude of the voltage across the electrode and the multi-wall nanotubes, thereby drawing the inner tube at least partially back into the outer tube of each multi-wall nanotube and changing the capacitance of a variable capacitor defined by the electrode and the inner tube.

10. The method of claim 9 wherein the operation of increasing a potential energy further comprises independently applying voltage to sub-groups of the plurality of multi-wall nanotubes.

11. The method of claim 9 wherein the operation of increasing a potential energy further comprises:
(a) determining a period of time for charging the multi-wall nanotubes; and
(b) charging the multi-wall nanotubes in the determined period of time by increasing the magnitude of the applied voltage at a rate that achieves a requisite separation between the electrode and an end of the inner tube in the period of time.

12. The method of claim 9 wherein the operation of discharging electrical energy further comprises:
(a) determining a period of time for discharging the multi-wall nanotubes; and
(b) discharging the multi-wall nanotubes in the determined period of time by decreasing the magnitude of the applied voltage at a rate that causes the inner tube to be drawn back within the outer tube in the period of time.

* * * * *